United States Patent

Bowden et al.

[11] Patent Number: 5,579,862
[45] Date of Patent: Dec. 3, 1996

[54] ANTI-THEFT APPARATUS FOR A VEHICLE

[76] Inventors: Raymond A. Bowden, P.O. Box 27 16 Lucerne Road, Fulwood, Preston Lanes PR2 6FB, United Kingdom; Roland W. Cross, 23 Gisburn Road, Ribbleton, Preston Lanes PR2 6SS, United Kingdom

[21] Appl. No.: 422,828

[22] Filed: Apr. 17, 1995

[51] Int. Cl.⁶ .................................................. B60R 25/00
[52] U.S. Cl. ........................................ 180/287; 280/763.1
[58] Field of Search ........................... 280/763.1; 180/287

[56] References Cited

U.S. PATENT DOCUMENTS 3,008,730  11/1961  Lisota ..................................... 280/763.1
3,836,173   9/1974  Schwaiger ............................. 280/763.1
4,070,041   1/1978  Brammer ............................... 280/763.1

*Primary Examiner*—Kenneth R. Rice

[57] ABSTRACT

An anti-theft apparatus for a vehicle comprises a housing (1) with an annular collar (4) for attachment to a structural member (2,3) of the vehicle and a stanchion (7) axially movable within the collar (4). A means, such as a circlip (12), locking screw (23) or locking bars (38), is, provided for locking the stanchion (7) to the housing in at least one position relative thereto. A screwjack (15) forming part of the stanchion (7) and terminating in a foot (18) can be extended or retracted by rotation relative to the stanchion (7) to move the foot (18) in order, in use, to engage or disengage a fixed surface such as the ground adjacent the exterior of the vehicle.

12 Claims, 4 Drawing Sheets

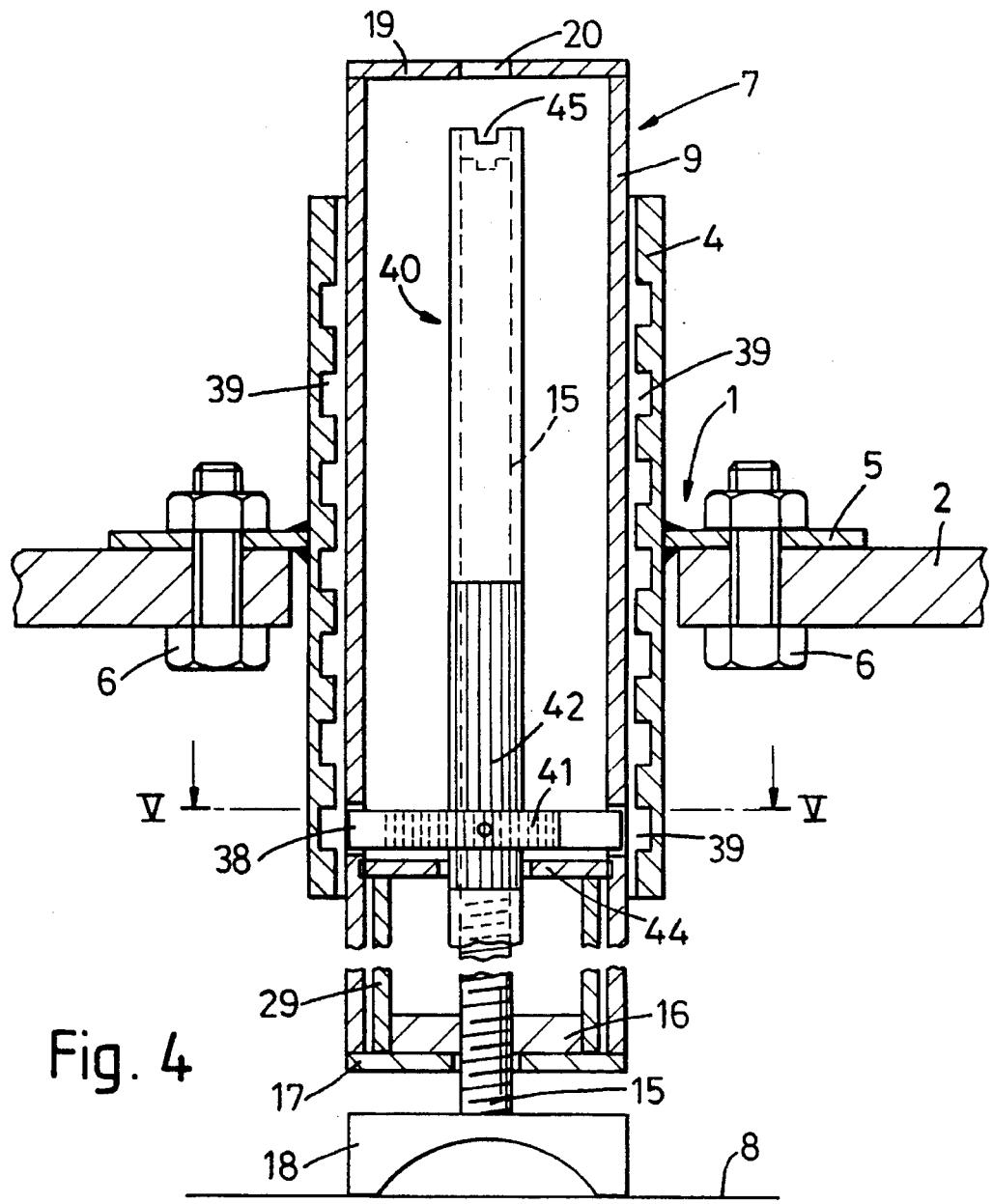

५,५७९,८६२

ANTI-THEFT APPARATUS FOR A VEHICLE

The present invention relates to an anti-theft apparatus for a vehicle or vehicle trailer.

Anti-theft devices for vehicles are known which comprise retractable poles or rods which can be extended beneath the vehicle when it is stationary.

BACKGROUND TO THE INVENTION

In U.S. Pat. No. 3,836,173 is described an anti-theft device comprising for and aft spurs which are arranged to depend from a towed vehicle when stationary and thrustingly engage the ground if any attempt to move the vehicle is made. The spurs are slidable received in vertically disposed tubular housing members which define openings in the floor of the vehicle. The upper end of each spur is securely held in one of several extended vertical positions by a locking mechanism which is only accessible from the interior of the vehicle. However, this device has the disadvantage that the length of spur which protrudes beneath the vehicle is limited to that achieved in each of the discrete vertical positions wherein the spur can be locked to the housing member. No fine adjustment of the length of the spur is possible and, as a result, the spurs are not suitable for use as stanchions. The device is designed only for use with towed vehicles.

Likewise, GB 2,218,952 describes an anti-theft apparatus wherein an elongate tubular member with a length approximating to the distance between the ground and the floor of the vehicle can be slid downwardly through an annular housing located in the floor of the vehicle and locked into a position wherein a serrated end of the tubular member is in close proximity to the ground. Any attempt to tilt or move the vehicle is then inhibited by the serrated tube end making contact with the ground. However, as the tube can only be locked in one position relative to the annular housing, again no fine adjustment of the position of the tube in the housing can be made to take into account uneven ground.

The object of the present invention is to overcome or substantially mitigate the aforementioned disadvantages.

SUMMARY OF THE INVENTION

According to the present invention there is provided an anti-theft apparatus for a vehicle comprising a housing for attachment to a structural member of the vehicle and defining an annular collar; an elongate tubular member movable within the collar; means for locking the tubular member to the housing in at least one position relative thereto; a screwjack located within the tubular member and movable relative thereto into an extended position in order to project one end thereof outwardly of the exterior of the vehicle in use; a foot connected to said one end of the screwjack; and means for rotating the screwjack relative to the tubular member to move the foot away from or towards the member in order, in use, to engage or disengage a fixed surface adjacent the exterior of the vehicle.

Preferably, the tubular member is axially movable within the collar and and can be locked in an extended position relative to the collar and thereby, in use, the exterior of the vehicle. Alternatively, the axial position of the tubular member is fixed relative to the collar but the tubular member can be rotated relative to the collar.

Preferably also, a freely rotatable tube surrounds at least the lower portion of the screwjack inside the tubular member.

BRIEF DESCRIPTION OF THE DRAWINGS

An anti-theft apparatus according to the present invention will now be described by way of example with reference to the accompanying drawings, in which:

FIG. 4 is a view similar to FIG. 1 but of a fourth embodiment of apparatus; and

FIG. 5 is a cross-section along the line V—V in FIG. 4.

DETAILED DESCRIPTION

Figure 1:
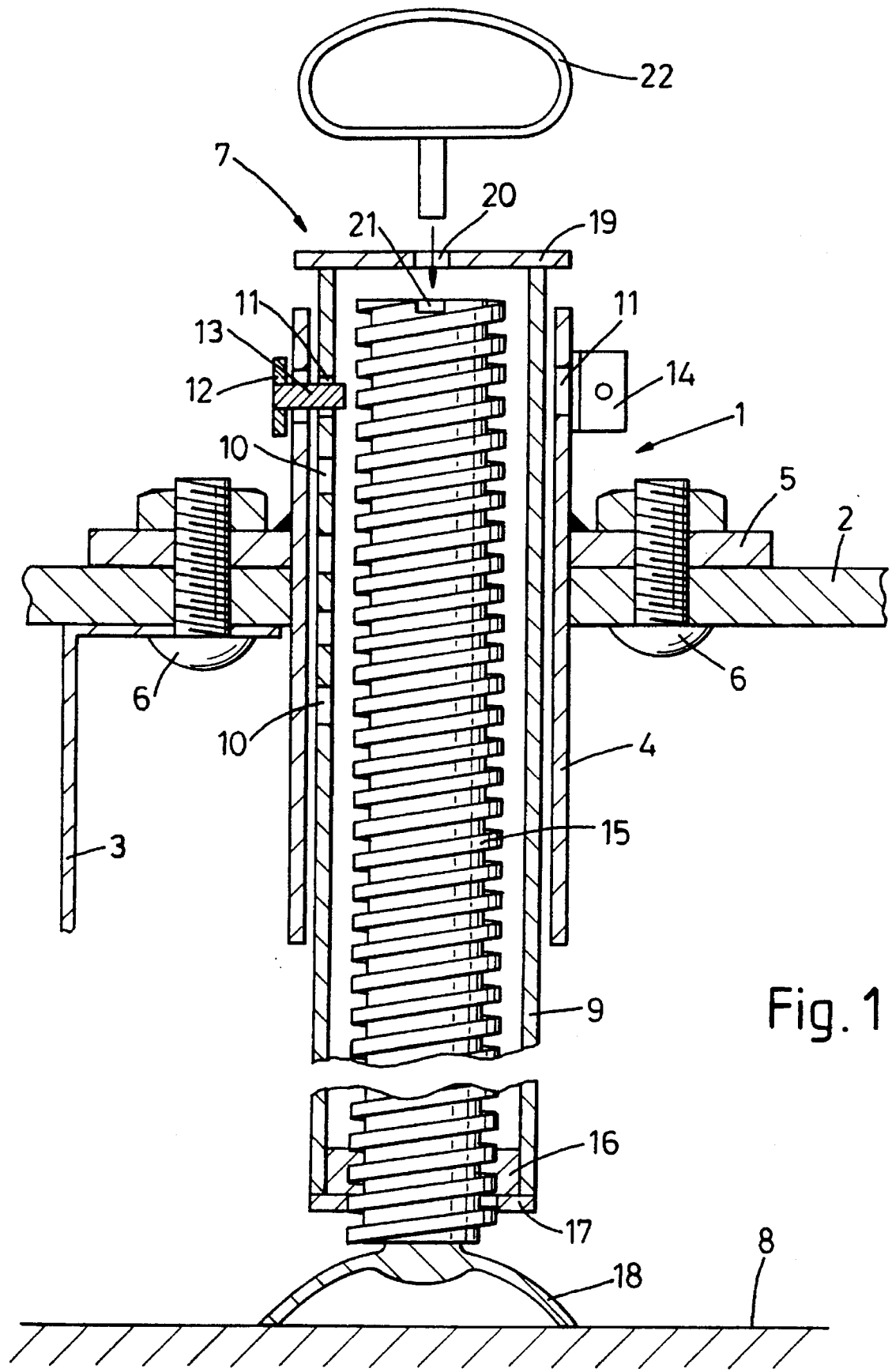
FIG. 1 is a sectional side view of a first embodiment of an anti-theft apparatus when mounted in a vehicle and in a vertically extended position.

With reference to FIG. 1, an anti-theft apparatus comprises a housing 1 which is for attachment to a structural member of vehicle. In most circumstances, the structural member will be the floor 2 and/or the chassis 3 of the vehicle.

Figure 2:
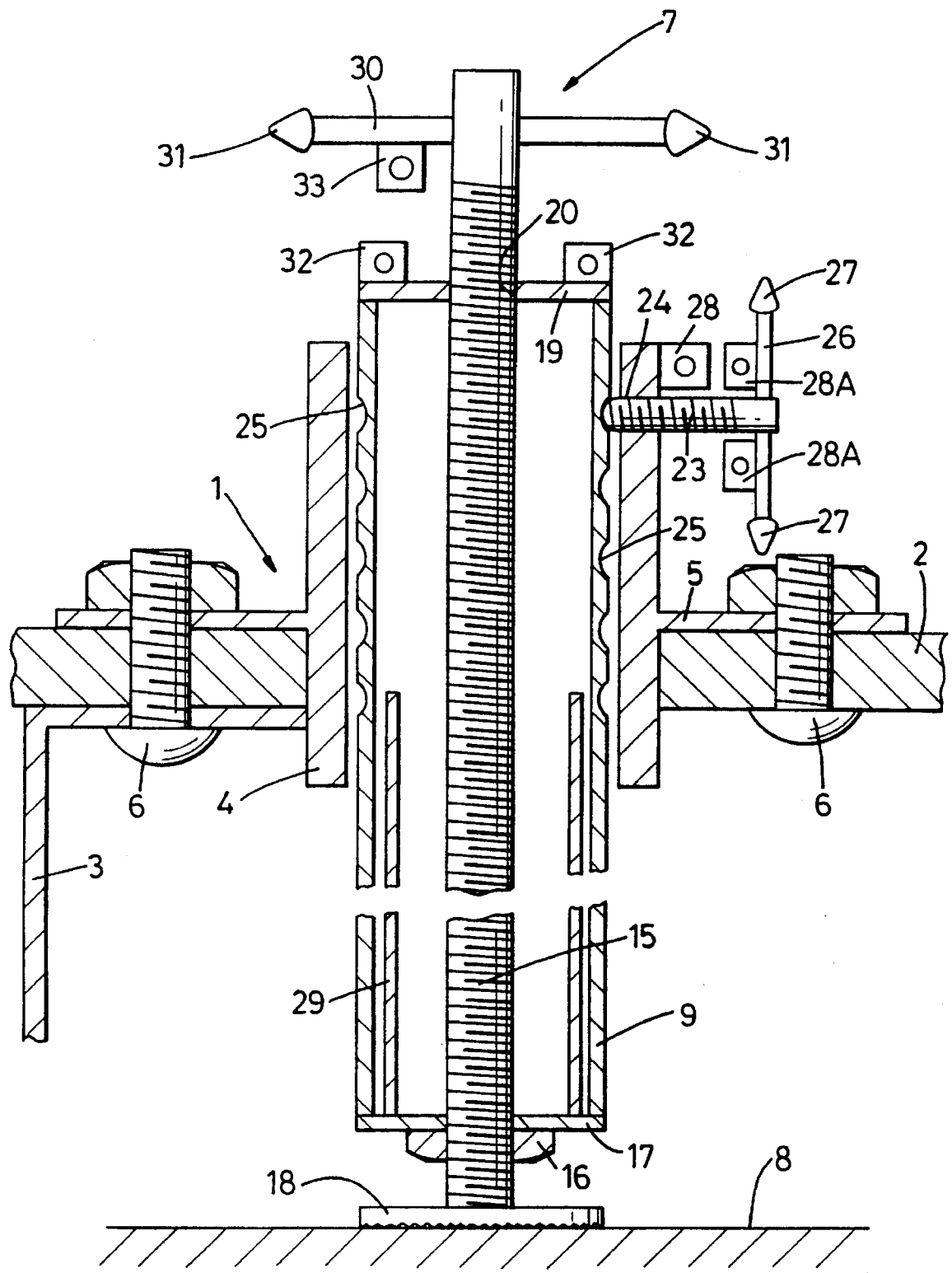
FIG. 2 is a view similar to FIG. 1 but of a second embodiment of apparatus.

The housing 1 comprises an annular collar 4 for location through a suitably sized aperture, which has been cut through the floor 2 and/or chassis 3, and a peripheral flange 5, which is provided with holes to enable it to be rigidly secured to the interior floor 2 or chassis 3 around the aperture by bolts 6 or the like. The flange 5 can be either welded to the collar 4 as shown in FIG. 1, or be made integral, therewith as shown in FIG. 2.

A stanchion 7 is slidably located within the collar 3 so that it can either be projected downwards in an extended position into close proximity with the ground 8 or other surface exterior to and adjacent the vehicle or be retracted upwards into the interior of the vehicle. The stanchion 7 comprises a cylindrical tube 9 which has an exterior diameter only slightly less than the interior diameter of the collar 4 so that it can slide easily within the collar but without being able to wobble significantly.

Along the length of the tube 9 is formed a series of holes 10 which can each register sequentially with one or other of a pair of opposed holes 11 formed in the upper part of the collar 3 dependent on the degree to which the tube 9 is projected through the collar 4. By this means, a hinged locking band or circlip 12 with a projecting spur 13, which can be located through a registering pair of holes 10 and 11 to pass through both the collar 4 and the tube 9, can be used to lock the tube 9 in position and prevent relative movement of the tube 9 with respect to the collar 4. The circlip 12 is provided with a pair of lugs 14 which are pierced to permit a padlock or similar to be used to lock the circlip 12 in position.

Axially located within the tube 9 is a screwjack 15. The screwjack 15 is supported at the lower end of the tube 9 by being screwed through a threaded nut 16 which is rigidly attached to a cap 17 which closes off the lower end of the tube 9. Adjacent the cap 17 and beyond the end of the tube 9 the screwjack 15 terminates in an enlarged foot 18. The foot 18 comprises an inverted dish with a rim capable of penetrating into soft ground.

The upper end of the tube 9 is closed by a second cap 19 which is provided with a central aperture 20. The screwjack 15 terminates beneath the top of the tube and its end 21 is adapted for engagement by a key 22, such as an Allen key, which can be inserted through the aperture 20 to engage the screwjack 15. By this means, the screwjack 15 can be screwed upwardly or downwardly into or out of the bottom of the tube 9.

In use, the apparatus is preferably fitted to a structural member of the vehicle so that it can be operated from inside the vehicle with only the downwardly protruding lower end of the tube 9, the screwjack 15 and the foot 18 visible from the exterior of the vehicle. Whilst the apparatus has been designed primarily to engage the ground if any unauthorised attempt is made to move the vehicle, if the vehicle is a trailer, such as a caravan, several apparatuses could be fitted thereto for additional use as supports to retain the vehicle level whilst it is stationary.

As previously indicated, the housing is designed for permanent fitment to the vehicle. Whilst the vehicle is in motion, the stanchion 7 is retained in a retracted position or removed altogether from the housing 1. However, when the vehicle is parked, the stanchion 7 is intended to be extended to protrude outwards from the vehicle to engage the ground 8 or other adjacent surface. This operation is preferably accomplished as follows.

First, if the stanchion is in a retracted position, the locking band 12 is unlocked and removed from the tube 9 which is then pushed downwards into the lowest permitted position possible wherein it can again be locked to the collar 4 by the circlip 12 and associated padlock. During this operation, the screwjack 15 should be located in its highest possible position within the tube 9. Alternatively, if the stanchion has been removed from the housing 1, the tube 9 is located in the collar 4 and again located in the lowest possible position with the screwjack 15 retracted into the tube 9. Thereafter, the key 22 is used to screw down the screwjack 15 until the foot 18 bites into the ground 8, preferably to raise slightly the level of the vehicle sufficient to jack at least one wheel out of contact with the ground. If the apparatus or several such apparatuses are being used additionally to level a towed vehicle, then each respective screwjack 15 can be screwed downwards appropriately until the floor 2 is horizontal. The key or keys 22 can then be removed.

Once the apparatus has been operated to safeguard a vehicle, any attempt to move the vehicle without first retracting the stanchion 7 will be thwarted. In a motor vehicle the raising of at least one wheel from the ground will effectively prevent it from being driven away. Similarly, in a towed vehicle, any attempt to tip the vehicle to permit it to be connected to a towbar will be prevented by the foot 18 biting into the ground 8.

It will also be appreciated that as the apparatus is operated from within the vehicle, tampering with the apparatus itself is made more difficult.

A second embodiment of the apparatus will now be described which incorporates further features designed to deter tampering therewith.

The construction of this second embodiment is broadly similar to that of the first embodiment and components with the same or similar function have been given the same reference numerals. However, this embodiment differs from the first in the way in which the stanchion 7 is locked to the collar 4, the design of the screwjack 15 and its foot 18, and the manner in which the key 22 engages with the screwjack 15. These differences will now be described in turn.

First, the tube 9 is not locked to the collar 4 by a circlip or locking band. Rather in this case a locking screw 23 is used to screw through a tapped bore 24 in the collar 4 to engage frictionally the exterior of the tube 9. It will be appreciated that in view of this the holes 11 and 12 are not required but advantageously the exterior diameter of the tube 9 is provide with a series of annular grooves 25 into which the end of the screw 23 can be located. To assist in the rotation of the screw 23, its head is provided with a cross-bar 26 with enlarged ends 27. However, to deter tampering once the screw 23 has been screwed into position, a pierced lug 28 is provided rigidly connected to the collar 4 adjacent the screw 23 to permit a padlock to be located through the lug and around the cross-bar 26 between its ends 27 to prevent it from being turned sufficient to release the tube 9. Alternatively, a similar lug or lugs 28A could also be provided on the cross-bar 26 through one of which the padlock can be passed in addition to the lug 28.

The screwjack 15 in this embodiment has a significantly smaller diameter in relation to the diameter of the tube 9 than in the first embodiment. It will be appreciated that this could make it more attractive to a thief to attempt to saw through the lower portion of the stanchion. To deter this, a second freely rotatable tube 29 is located around the lower portion of the screwjack 15 within the tube 9. The tube 29 rests on the lower cap 17. Hence, if the tube 9 is cut through by, for example, a hacksaw, the second freely rotatable tube 29 will thwart further progress. In addition, the design of the foot 18 has be altered to be flat with a roughened or serrated lower surface so that less of the screwjack 15 is visible below the end of the tube 9. In this way the stanchion 7 would still be effective against theft for towed vehicles if the foot 18 were to be removed as it would still bite into the ground if the vehicle were to tipped. In this regard, it is also advantageous for at least the tube 9, the screwjack 15 and the tube 29 to be made from a hand high carbon steel.

The key 22 in this embodiment is not detached from the screwjack 15 but permanently attached to it, the screwjack 15 extending through the cap 19 and having a cross-bar 30 with enlarged ends 31 connected thereto. In order to prevent the screwjack 15 from being tampered with after the stanchion 7 has been set, the cap 19 is provided with one or more pierced lugs 33 and a pierced lug 33 is also provided on the cross-bar 30 so that a padlock can be looped through one each of the lugs 32 and 33 to prevent the position of the screwjack 15 from being significantly altered.

Figure 3:
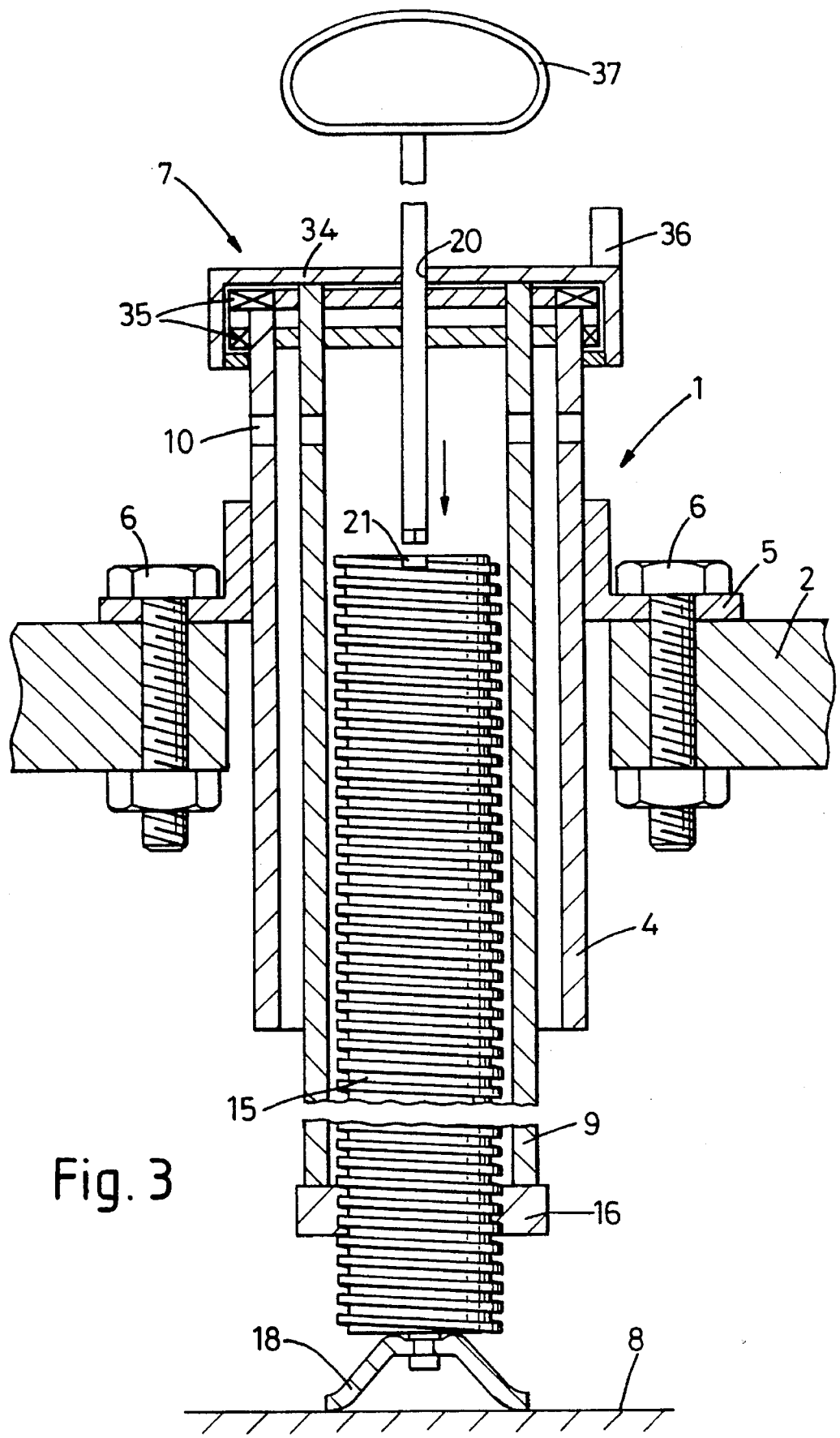
FIG. 3 is a view similar to FIG. 1 but of a third embodiment of apparatus.

A third embodiment of the apparatus will now be described with reference to FIG. 3. The construction of this embodiment is similar, in part, to that of the first embodiment and components with the same or similar function have been given the same reference numerals.

In this embodiment the stanchion 7 is not removable from the collar 4, the tube 9 being rigidly connected to a cap 34 which overhangs the top of the collar 4 and houses bearings 35. The cap 34 replaces the cap 19 shown in FIG. 1. The bearings 35 permit the tube 9 to be rotated within and relative to the collar 4 and to this end the cap 34 has an attached fold-away handle 36.

As the tube 9 cannot be withdrawn from the collar 4, whilst it is advantageous if it projects some way below the end of the collar 4 to offer protection to the screwjack 15, it does not extend downwards to the same extent as described with reference to FIGS. 1 and 2. However, in comparison with the embodiment shown in FIG. 1, the travel of the screwjack 15 within the tube 9 and the length of the key 22 which engages the end of the screwjack 15 are correspondingly greater. To facilitate use, a handle 37 at the top of the key 22 is preferably mushroom shaped so that pressure can be applied to it comfortably by the palm of one's hand.

In operation, in order to engage the foot 18 with the ground or other surface located below the vehicle, the key 22 is engaged in the end 21 of the screwjack 15 and the tube 9 is then rotated in a first direction via the handle 36 whilst pressure is exerted on the handle 37 of the key 22. This will screw the screwjack 15 downwardly out of the tube 9 until the foot 18 contacts and bites into the ground 8. Thereafter, any further extension of the screwjack 15 out of the tube 9 will tend to jack up the vehicle provided the ground is sufficiently hard.

It will be appreciated that if the vehicle is a towed vehicle that prior to operation of the apparatus, the vehicle is preferably levelled using its own fold-down stanchions so that less effort is required when operating the apparatus.

When the screwjack 15 has been extended sufficiently, the tube 9 should turned up to a further half turn to align one of an opposed pair of holes 10 in the tube 9 with a hole 13 in the collar 4 to enable the tube 9 to be locked to the collar 4 via a locking band or circlip 12 in a similar manner to the first embodiment. As the tube does not move axially with respect to the collar 4 only one pair of holes 10 is required in the tube 9. Thereafter, the key 22 can be withdrawn and stored remote from the apparatus.

A fourth embodiment of the apparatus will now be described with reference to FIGS. 4 and 5. As before, the construction of this embodiment is broadly similar to that of the previous embodiments and components with the same or similar function have been given the same reference numerals.

In this embodiment, the stanchion 7 is again removable from the collar 4 but differs from the others in the way in which it is locked to the collar 4. This locking mechanism will now be described.

In place of a locking screw or circlip, the stanchion 7 is provided with a pair of locking bars 38 which are located internally of the tube 9 but can be moved in opposite directions to project through a pair of opposed holes 11 formed in the tube 9 and to locate into one of a series of annular grooves 39 formed along the inner surface of the collar 4.

The bars 38 are moved via a rack and pinion mechanism which is located around the central screwjack 15, the portions of the bars 38 innermost within the tube 9 comprising the rack 41 and a tubular sheath 40 located around the screwjack 15 being provided with splines 42 at one end to form the pinion. The bars 38 are held in position by a spring-loading mechanism 43 which is connected to the tube 9 and a plate 44 fixed in the tube 9 below the bars 38.

It will be appreciated that the sheath 40 is rotatable independently of the screwjack 15 and can be rotated by means of a locking key (not shown) which, in a similar way to key 22, locates through an appropriate aperture 20 in the cap 19 to engage the sheath 40 via a keyway 45 and permit to be turned relative to the tube 9. When the locking key is turned in a first direction, the pinion 42 is also turned to move the bars 38 outwardly of the holes 11 and into whichever of the grooves 39 lies adjacent the holes 11, dependent on the relative position of the tube 9 within the collar 4. Turning of the locking key in an opposite direction has the opposite effect and withdraws the locking bars 38 back within the tube 9. It will be appreciated that the grooves 39 towards the top of the collar 4 are intended to hold the stanchion 7 in a retracted position whereas those towards the bottom of the collar are for use when the stanchion is extended in an anti-theft mode.

Hence, in use, if the stanchion 7 is in locked in retracted position, the locking key is used to retract the locking bars 38 into the tube 9 which is then free to slide within the collar 4. The tube 9 is then pushed downwards into the lowest permitted position possible wherein it can again be locked to the collar 4 by the bars 38. As previously described during this operation, the screwjack 15 should be located in its highest possible position within the tube 9. Thereafter, the key 22 (not shown in FIG. 4) is used to screw down the screwjack 15 until the foot 18 bites into the ground 8, preferably either to level the vehicle or to raise slightly the level of the vehicle sufficient to jack at least one wheel out of contact with the ground. Both the key 22 and the locking key can then be removed for remote storage.

In a further effort to prevent unauthorized tampering, all embodiments of the invention as described above can also be provided with additional means. In particular, one or more electrically operated alarms could be used in combination with the apparatus to draw attention if appropriate parts of the apparatus were to be tampered with, for example if an attempt were made to move the position of either the tube 9, the screwjack 15, the circlip 12 or the locking screw 23.

It will also be appreciated that operation of the apparatus according to the invention could be adapted to be motorized rather than being manual. This would greatly facilitate use, particularly if it is desired to use the apparatus for jacking a vehicle significantly off the ground. In these circumstances, appropriate locking mechanisms and alarm systems could be built into the motor drive arrangement.

I claim:

1. A dual purpose and dual action anti-theft device for a vehicle, caravan or a trailer with a periodically adjustable and finitely adjustable stanchion leg with a lockable mechanism that is incorporated and interacting with all the functions that are totally contained within the said stanchion leg and that the said stanchion legs are interposable between the ground and the chassis connected to the housing and annular collar of the said vehicle and that of which is comprising of said housing for attachment to a structural member of the vehicle and defining annular collar; an elongate tubular member to the housing in at least one position relative thereto; a screwjack located within the tubular member and moveable relative thereto into an extended position in order to project one end thereof outwardly of the exterior of the said vehicle in use; a foot connected to said one end of the screwjack; and means for rotating the said screwjack relative to the tubular member to the foot; away from or towards the member in order, in use, to engage or disengage a fixed surface adjacent the exterior of the vehicle wherein the means for locking the tubular member comprises at least one locking bar which can be extended to project outwardly from within the tubular member to engage an adjacent surface of the collar wherein the locking bar is linked via a rack and pinion mechanism contained wholly within the said tubular sheath and therein a screwjack and by means of which the said rack and pinion mechanism can be operated to extend or retract the locking bar and that can only be operated by the externally connected axially turning shaft that can be externally locked and operated by a camshaft key.

2. A dual purpose and dual action anti-theft device for a vehicle as claimed in claim 1, wherein the tubular member is axially movable with the collar and can be locked in an extended position relative to the collar and thereby, in use, the exterior of the vehicle.

3. A dual purpose and dual action anti-theft device for a vehicle as claimed in claim 1, wherein the axial position of the tubular member is fixed relative to the collar but the tubular member can be rotated relative to the collar.

4. A dual purpose and dual action anti-theft device for a vehicle as claimed in claim 3, wherein rotation of the tubular member can be rotated relative to the collar whilst pressure is exerted axially on the screwjack, and rotates the screwjack relative to the tubular member to move the foot away from or towards the member.

5. A dual purpose and dual action anti-theft device for a vehicle as claimed in claim 4, wherein the circlip is adapted to enable it to be locked in position by a padlock.

6. A dual purpose and dual action anti-theft device for a vehicle as claimed in any one of claims 1 to 3, wherein the means for locking the tubular member to the housing comprises a locking screw which can be screwed through a tapped bore in the collar to engage the tube.

7. A dual purpose and dual action anti-theft device for a vehicle as claimed in claim 6, wherein the locking screw is adapted to enable it to be locked in position relative to the collar by a padlock.

8. A dual purpose and dual action anti-theft device for a vehicle as claimed claim 1, wherein the means for rotating the screwjack relative to the tubular member comprises of a key that can be engaged with the screwjack to rotate the same.

9. A dual purpose and dual action anti-theft device for a vehicle as claimed claim 1, wherein the means for rotating the screwjack relative to the tubular member can be releasable locked to the tubular member, to prevent significant rotation of the screwjack relative thereto.

10. A dual purpose and dual action anti-theft device for a vehicle as claimed in claim 1 or 9, wherein a freely rotatable tube surrounds at least the lower portion of the screwjack inside the tubular member.

11. A dual purpose and dual action anti-theft device for a vehicle as claimed in claim 1, wherein the foot comprises an inverted cup, with a rim capable of penetrating into soft ground.

12. A dual purpose and dual action anti-theft device for a vehicle as claimed in claim 6, wherein a freely rotatable tube surrounds at least the lower portion of the screwjack inside the tubular member.

* * * * *